US007200128B2

(12) United States Patent
Raith

(10) Patent No.: US 7,200,128 B2
(45) Date of Patent: Apr. 3, 2007

(54) METHODS AND SYSTEMS FOR MULTIPLEXING OF MULTIPLE USERS FOR ENHANCED CAPACITY RADIOCOMMUNICATIONS

(75) Inventor: Alex Krister Raith, Durham, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1116 days.

(21) Appl. No.: 10/041,449

(22) Filed: Jan. 10, 2002

(65) Prior Publication Data

US 2002/0057661 A1    May 16, 2002

Related U.S. Application Data

(62) Division of application No. 09/079,205, filed on May 15, 1998, now Pat. No. 6,535,497.

(60) Provisional application No. 60/084,913, filed on May 11, 1998.

(51) Int. Cl.
*H04B 7/26* (2006.01)
*H04Q 7/20* (2006.01)

(52) U.S. Cl. .................. 370/336; 370/442; 370/458; 375/261; 375/298; 375/341

(58) Field of Classification Search ................ 370/336, 370/442, 458; 375/261, 298, 341
See application file for complete search history.

(56) References Cited

U.S. PATENT DOCUMENTS

| | | | |
|---|---|---|---|
| 4,980,897 A | 12/1990 | Decker et al. | |
| 5,175,867 A | 12/1992 | Wejke et al. | |
| 5,241,563 A * | 8/1993 | Paik et al. | 375/262 |
| 5,287,374 A * | 2/1994 | Parr | 714/774 |
| 5,327,576 A | 7/1994 | Uddenfeldt et al. | |
| 5,353,332 A | 10/1994 | Raith et al. | |
| 5,442,626 A * | 8/1995 | Wei | 370/207 |
| 5,517,492 A | 5/1996 | Spear | |
| 5,533,004 A * | 7/1996 | Jasper et al. | 370/204 |
| 5,544,156 A * | 8/1996 | Teder et al. | 370/342 |
| 5,577,047 A | 11/1996 | Persson et al. | |
| 5,666,370 A * | 9/1997 | Ganesan et al. | 714/752 |
| 5,673,291 A | 9/1997 | Dent | |
| 5,751,730 A * | 5/1998 | Mourot | 714/755 |
| 5,805,583 A * | 9/1998 | Rakib | 370/342 |
| 5,920,597 A * | 7/1999 | Khayrallah et al. | 375/265 |
| 6,097,716 A * | 8/2000 | Abrishamkar | 370/342 |
| 6,463,076 B1 * | 10/2002 | Suzuki | 370/459 |

FOREIGN PATENT DOCUMENTS

| | | |
|---|---|---|
| AU | 45874/76 | 9/1996 |
| JP | 09-107344 | 4/1997 |
| WO | WO98/04047 | 1/1998 |

OTHER PUBLICATIONS

European Search Report re RS 101334 Date of completion of search: Oct. 7, 1998.

* cited by examiner

*Primary Examiner*—Alpus H. Hsu
(74) *Attorney, Agent, or Firm*—Roger S. Burleigh

(57) ABSTRACT

A radiocommunication system supports multi-user multiplexing. Half rate data communications with interleaving of data between two sources are described.

19 Claims, 11 Drawing Sheets

Fig. 5
(Prior Art)
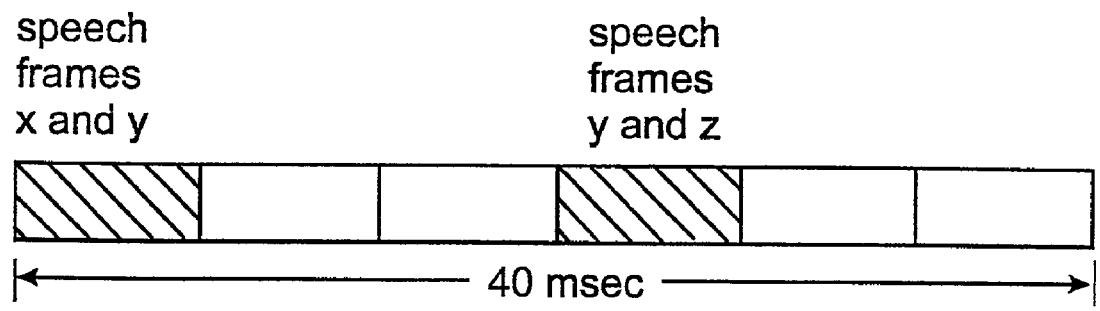
Fig. 7
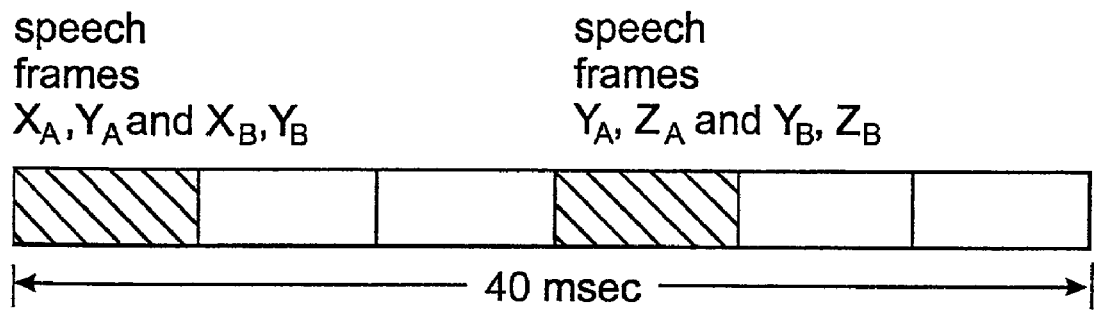
Fig. 8
AABBAABBAABBAA..

Fig. 9
| AA | AAA | AAA | A |
|----|-----|-----|---|
| 001 | 100 | 110 | 011 | 011 | 101 |
| | BBB | BBB | BBB | | |
Fig. 10
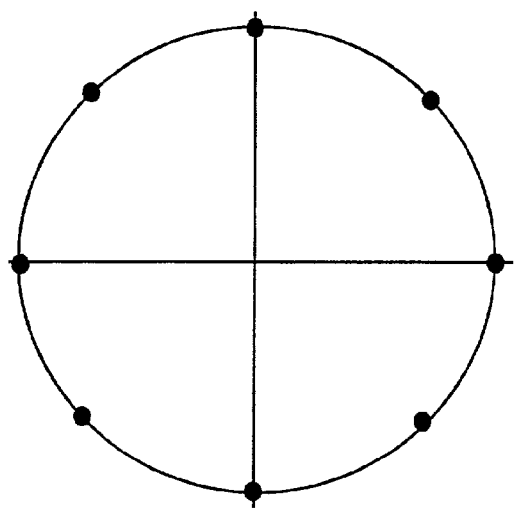
Fig. 11
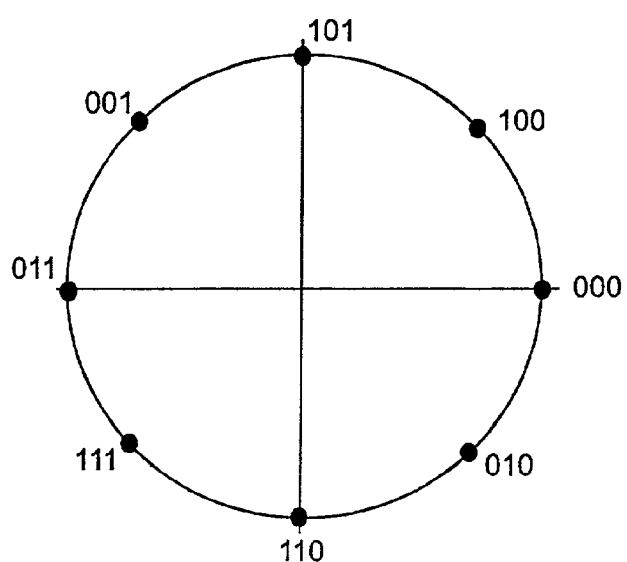

Fig. 16 (a)

| SYNC | REF | PC | DATA | PLT | DATA | PLT | DATA | PLT | DATA | PLT | ramp |
|---|---|---|---|---|---|---|---|---|---|---|---|
| 14 SYMBOLS | 3 | 1 | 101 | 9 | 99 | 9 | 99 | 9 | 99 | 9 | 6 |

Fig. 16 (b)

| SYNC | PC | DATA | ramp |
|---|---|---|---|
| 14 SYMBOLS | 1 | 437 | 6 |

METHODS AND SYSTEMS FOR MULTIPLEXING OF MULTIPLE USERS FOR ENHANCED CAPACITY RADIOCOMMUNICATIONS

RELATED APPLICATION

This application is a divisional of application Ser. No. 09/079,205, filed on May 15, 1998 now U.S. Pat. No. 6,535,497.

This application is related to, and claims priority from, U.S. Provisional Patent Application Ser. No. 60/084,913, filed on May 11, 1998 to Krister Raith having the same title as above, the disclosure of which is expressly incorporated here by reference.

BACKGROUND

Applicant's invention relates to electrical telecommunication, and more particularly to wireless communication systems, such as cellular and satellite radio systems, for various modes of operation (analog, digital, dual mode, etc.), and access techniques such as frequency division multiple access (FDMA), time divisional multiple access (TDMA), code divisional multiple access (CDMA), hybrid FDMA/TDMA/CDMA, for example. More specifically, this invention relates to methods and systems which detect multiple information streams which are transmitted as a composite signal in a manner intended to improve the detection of the individual streams.

In North America, digital communication and multiple access techniques such as TDMA are currently provided by a digital cellular radiotelephone system called the digital advanced mobile phone service (D-AMPS), some of the characteristics of which are specified in the interim standard TIA/EIA/IS-54-B, "Dual-Mode Mobile Station-Base Station Compatibility Standard", published by the Telecommunications Industry Association and Electronic Industries Association (TIA/EIA) and some of which are specified by the later interim standard IS-136 (which describes, among other things a digital control channel) which standards are expressly incorporated herein by reference. Because of a large existing consumer base of equipment operating only in the analog domain with frequency-division multiple access (FDMA), TIA/EIA/IS-54-B is a dual-mode (analog and digital) standard, providing for analog compatibility together with digital communication capability.

In a TDMA cellular radiotelephone system, each radio channel is divided into a series of time slots, each of which contains a burst of information from a data source, e.g., a digitally encoded portion of a voice conversation. The time slots are grouped into successive TDMA frames having a predetermined duration. The number of time slots in each TDMA frame is related to the number of different users that can simultaneously share the radio channel. If each slot in a TDMA frame is assigned to a different user, the duration of a TDMA frame is the minimum amount of time between successive time slots assigned to the same user.

The successive time slots assigned to the same user, which are usually not consecutive time slots on the radio carrier, constitute the user's digital traffic channel (DTC), which may be considered a logical channel assigned to the user. In only one of many possible embodiments of a TDMA system as described above, the TIA/EIA/IS-54-B, IS-136 standards provided that each TDMA frame consists of six consecutive time slots and has a duration of 40 milliseconds (msec) as illustrated in FIG. 1. Thus, each radio channel can carry from three to six DTCs (e.g., three to six telephone conversations), depending on the source rates of the speech coder/decoders (codecs) used to digitally encode the conversations.

Such speech codecs can operate at either full-rate or half-rate. A full-rate DTC requires twice as many time slots in a given time period as a half-rate DTC, and in TIA/EIA/IS-54-B and IS-136, each full-rate DTC uses two slots of each TDMA frame, i.e., the first and fourth, second and fifth, or third and sixth of a TDMA frame's six slots. Each half-rate DTC uses one time slot of each TDMA frame. During each DTC time slot, as seen in FIG. 2, 324 bits are transmitted, of which the major portion, 260 bits, is due to the speech output of the codec, including bits due to error correction coding of the speech output, and the remaining bits are used for guard times and overhead signalling for purposes such as synchronization.

Once information has been output from the speech codec, it is then processed for transmission on a radio carrier. This processing can be generalized as illustrated in the upper branch of FIG. 3. Therein, channel coding 30 and interleaving 32 are provided to protect against channel errors which corrupt the information as it is transmitted over the radio channel 36. Channel coding, e.g., block coding or convolutional coding, adds redundancy to the information stream which can be used to identify and correct errors which occur during transmission of the information over the radio channel. Bit errors which occur due to transmission over the radio channel frequently occur in bursts. However, certain types of channel coding are most effective at correcting single bit errors and are less effective at correcting long strings of erroneously received bits. Accordingly, interleaving is used to separate consecutive information bits and transmit them in a non-consecutive manner. In this way, burst errors are effectively spread out so that when the received information is de-interleaved, the channel coding is more likely to be able to correct the errors which occurred during transmission.

Different systems use different types of channel coding and interleaving. For example, systems designed in accordance with the IS-136 standard system described above can provide for channel coding and interleaving, according to one vocoder described therein, as illustrated in FIG. 4. Therein, output of the speech coder 40 is separated into class 1 and class 2 bits, class 1 bits being more important than class 2 bits in terms of the perceived signal quality upon reproduction and, therefore, being more heavily protected against errors. In fact, to further protect the 12 most perceptually significant class 1 bits, a 7 bit cyclic redundancy check (CRC) is computed over those 12 bits at block 42 and added to the string of bits to be convolutionally encoded at block 44. In convolutional encoding, an output, coded bit depends not only on the bit value of a most recently input bit, the bit values of preceding bits, which provides a form of memory that can be used to detect errors in the received signal stream. The rate of convolutional coding, in this example ½, denotes the amount of redundancy provided—in this case for every input information bit, two coded bits are produced. The coded class 1 bits and the uncoded class 2 bits are then ciphered (block 46) and interleaved (block 48) over two time slots as shown in FIG. 5. Thus, bits from each of two speech frames are transmitted in each time slot of D-AMPS systems to spread out burst errors as described above.

Returning to FIG. 3, the output of interleaver 32 is sent to modulator 34 wherein the data is modulated onto the radio frequency carrier. In the D-AMPS example described above, the particular modulation which is currently used is π/4 shifted, differentially encoded quadrature phase shift keying (DQPSK). In this scheme, as will be appreciated by those skilled in the art, information modulation is achieved by relative changes in phase of the modulating waveform. Grey coding is used in the constellation mapping (described below) of symbols to di-bits so that adjacent signal changes differ by only one bit. In this way, noise errors which result in the erroneous selection of a symbol associated with an adjacent phase create only a single bit error. Once the information is modulated, some post-processing (e.g., filtering and amplification) may be performed and the information is then transmitted over the radio channel.

For completeness, FIG. 3 also indicates functional blocks associated with a receiver, e.g., in a mobile station, that process the received signal. Therein, demodulator 38, de-interleaver 41 and decoder 43 effectively reverse the processes performed by modulator 34, interleaver 32 and channel encoder 30, respectively. Those skilled in the art will be familiar with the operation of these devices and, therefore, they are not further described herein. An optional equalizer 39 (or RAKE receiver, e.g., for a DS-CDMA system) may also be included in the signal processing path. This device handles the effects of signal reflections which occur during transmission of the information over the radio channel by, e.g., creating a model of the channel and attempting to determine the most likely transmitted sequence in view of the various echoes received during some reception interval.

As mentioned earlier, information in IS-136, as well as many other systems, can be transmitted at full or half rate. Half rate communications provide an opportunity for additional capacity in terms of the number of connections, since each frame supports, for example, six channels instead of three. However, the two-slot interleaving described above is applicable only to full rate transmissions, since half rate transmissions only use one time slot per frame. Thus, current implementations of half rate communications in IS-136 systems provide for no inter-slot interleaving and, accordingly, suffer from burst error correction problems.

Accordingly, it would be desirable to identify solutions to provide for half rate communications which overcome these problems and drawbacks. More generally, it would be desirable to provide systems and methods which consider multiuser detection wherein multiple users or sources transmit information in an overlaid or interleaved manner.

SUMMARY

These and other drawbacks and limitations of conventional methods and systems for communicating information are overcome according to the present invention, wherein Applicants present techniques and systems for multiplexing two users or sources into each time slot at half rate. This multiplexing technique provides, effectively, two sub-channels of information, which in turn provides an opportunity to improve decoding/demodulating of each sub-channel by re-encoding/remodulating information after successful decoding/demodulating of one sub-channel. Various modulation constellations are described which take advantage of the fact that certain bits in each symbol may be known.

BRIEF DESCRIPTION OF THE DRAWINGS

These and other objects, features and advantages of the present invention will become more apparent upon reading from the following detailed description, taken in conjunction with the accompanying drawings, wherein:

FIG. 5 illustrates two slot interleaving for full rate communications in a conventional IS-136 system;

FIG. 7 illustrates half rate communication involving sub-channels from two users or sources according to exemplary embodiments of the present invention;

FIG. 8 illustrates an exemplary symbol multiplexing embodiment of the present invention;

FIG. 9 depicts an exemplary inter-symbol multiplexing embodiment of the present invention;

FIGS. 10–14(a) illustrate various constellation mappings associated with 8-PSK modulation;

FIGS. 16(a) and 16(b) depict exemplary downlink formats for 8-PSK and 8-DPSK modulated transmissions, respectively.

DETAILED DESCRIPTION

The following exemplary embodiments are provided in the context of TDMA radiocommunication systems. However, those skilled in the art will appreciate that this access methodology is merely used for the purposes of illustration and that the present invention is readily applicable to various different types of access methodologies including, for example, hybrid TDMA/code division multiple access (CDMA).

Figure 6:
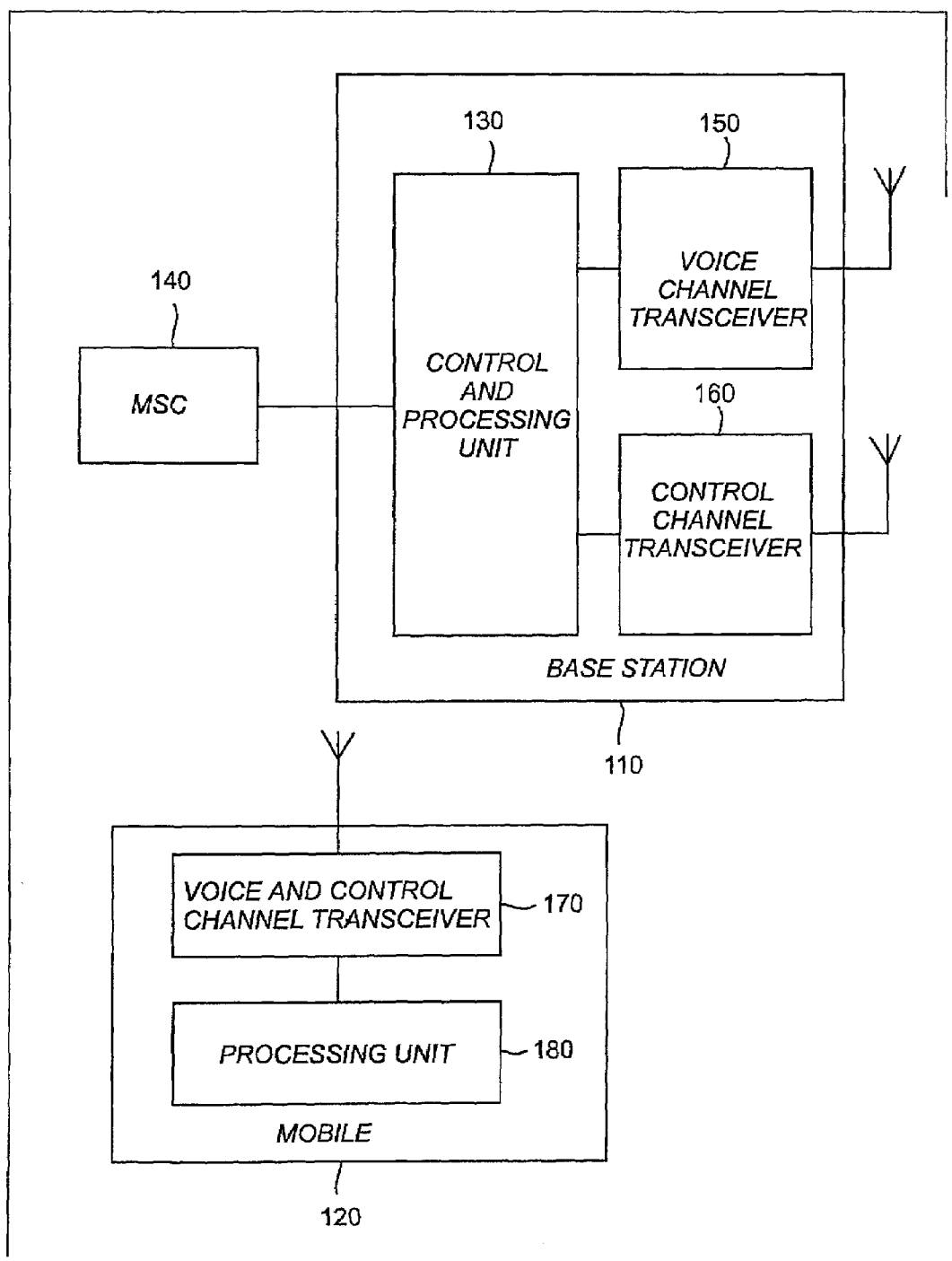
FIG. 6 is a block diagram of an exemplary mobile station and base station in a radiocommunication system.

FIG. 6 is a block diagram of an exemplary cellular mobile radiotelephone system in which the present invention can be implemented, including an exemplary base station 110 and mobile station 120. The base station includes a control and processing unit 130 which is connected to the MSC 140 which in turn is connected to the PSTN (not shown). General aspects of such cellular radiotelephone systems are known in the art, as described by the above-cited U.S. patent applications and by U.S. Pat. No. 5,175,867 to Wejke et al., entitled "Neighbor-Assisted Handoff in a Cellular Communication System," and U.S. patent application Ser. No. 07/967,027 entitled "Multi-mode Signal Processing," which was filed on Oct. 27, 1992, both of which are incorporated in this application by reference.

The base station 110 handles a plurality of voice channels through a voice channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the voice and control transceiver 170, for use with DCCs and DTCs that share the same radio carrier frequency.

The mobile station 120 receives the information broadcast on a control channel at its voice and control channel transceiver 170. Then, the processing unit 180 evaluates the received control channel information, which includes the characteristics of cells that are candidates for the mobile station to lock on to, and determines on which cell the mobile should lock. Advantageously, the received control channel information not only includes absolute information concerning the cell with which it is associated, but also contains relative information concerning other cells proximate to the cell with which the control channel is associated, as described in U.S. Pat. No. 5,353,332 to Raith et al., entitled "Method and Apparatus for Communication Control in a Radiotelephone System," which is incorporated in this application by reference.

As mentioned earlier, full rate communications in exemplary IS-136 systems provide for interleaving information from one user or source over each time slot assigned to that user (i.e., two for IS-136) within each TDMA frame as illustrated in FIG. 5. To extrapolate this type of interleaving to half rate communication as it is defined for IS-136 systems, i.e., each half rate user has only one time slot per frame, would suggest that information transmitted at half rate be interleaved over time slots of different TDMA frames. However, interleaving information over time slots of different TDMA for half rate communications would add an additional delay in the reproduction of the signal for half rate communications as opposed to full rate communications. Accordingly, it would be desirable to provide some form of interleaving for half rate communications to spread out burst errors which occur during the transmission of information between, for example, mobile station 120 and base station 110 without increased delay.

According to exemplary embodiments of the present invention, therefore, interleaving of information can be provided for half rate users sources between time slots of the same frame by interleaving information of different users in each time slot on the downlink. This provides the same interleaving delay at the receiver as full rate communication. Consider the exemplary downlink frame format of FIG. 7 to illustrate this concept.

Therein, information associated with portions of speech frames $X_A$ and $Y_A$ for user A and portions of speech frames $X_B$ and $Y_B$ for user B are multiplexed together and transmitted in time slot 1. Portions of speech frames $Y_A$ and $Z_A$ for user A and portions of speech frames $Y_B$ and $Z_B$ are multiplexed together and transmitted in time slot 4. Similar multiplexing of information from other users can be performed in time slots 2 and 5, and 3 and 6, such that six half-rate channels are still provided in each TDMA frame. By spreading the half rate information of both users A and B across time slots 1 and 4, burst errors are more readily corrected.

While this type of interleaving according to the present invention can be provided on the downlink it is not feasible for the uplink (mobile-to-base direction) due to the impossibility of timing the transmissions of non-geographically co-located transmitters associated with the various mobile stations. Despite the fact that the uplink is not conducive to this type of interleaving, mobile stations should be provided with some type of information regarding upon which uplink time slot they should transmit their data. Consider that conventional half rate communications provided one downlink time slot for each mobile station and, therefore, each mobile station simply transmitted its uplink burst in a corresponding time slot. However, since according to the present invention each mobile station may now receive half rate information on two time slots in each frame, the mobile stations must implicitly or explicitly recognize their assigned uplink time slot. An example of an explicit uplink time slot assignment is provided below in a discussion of mode signalling.

There are various ways in which the information associated with users A and B can be interleaved within each time slot. For example, interleaving can be performed on a symbol-by-symbol basis, which type of interleaving is referred to herein as "symbol multiplexing". Symbol multiplexing can take many forms, however generally bits associated with user A's information stream are allocated to be carried by one or more symbols, followed by bits associated with user B's information stream being allocated to one or more symbols, in some repeating pattern. Symbol multiplexing could take the form of every other symbol having bits therein solely associated with a user's information stream, two symbols at a time having information bits solely associated with a user's bit stream (as shown in FIG. 8) or any desired pattern. Symbol multiplexing could have varying pattern of repetition, e.g, AABABBAABABB, etc., as long as the pattern was known a priori to all remote units.

Interleaving of data from two different users in each time slot can also be performed on a bit-by-bit basis rather than a symbol-by-symbol basis. This can be achieved according to exemplary embodiments of the present invention by allocating one or more bits associated with user A's information stream to a symbol and filling the remaining positions in the symbol with one or more bits from user B's information stream. An example of this type of inter-symbol multiplexing is illustrated in FIG. 9. Therein a portion of a time slot is shown wherein three bit symbols are used to transmit information. Thus, the first symbol has two bits of information from user A's information stream and one bit of information from user B's information stream, while the second symbol has two bits of information stream from user B's information stream and one bit of information from user A. Like the previous embodiment which used symbol multiplexing to provide a mechanism for interleaving the data from two different users in two different time slots in one frame, inter-symbol multiplexing can also be used to distribute data associated with each user across spaced apart time slots in one frame to protect against burst errors in half rate communications.

Those skilled in the art will appreciate that multiplexing bits from different users in one time slot effectively creates two sub-channels within each time slot. In addition to assigning these sub-channels to different users, it should be appreciated that these sub-channels could also be assigned to different connections associated with one user. For example, information from both a voice connection and a data connection associated with one user could be transmitted at half rate by interleaving information from each connection over multiple time slots in a frame using either of the symbol multiplexing or inter-symbol multiplexing techniques described above. Likewise two voice or two data connections from one user could be transmitted in a similar fashion.

Since the preceding exemplary embodiments rely on information associated with two data sources, e.g., users, to be multiplexed over each time slot, a question arises as to how to handle the case where only one active user is being transmitted to by a base station. Various solutions are possible. First, this one active user could be switched to a full rate format (including use of a full rate vocoder). Of course, the mobile station would have to be informed of the switch, which is essentially equivalent to a handoff from half rate to full rate communications. This information can be passed to the mobile station using the mode signalling described below. Secondly, the two sub-channel concept described above could be replaced in this case by using the same vocoder as for the two sub-channel approach but applying more channel coding to fill in the bits normally supplied by the source of the second channel.

A third solution is to maintain the two sub-channels and send arbitrary or predefined data as the non-existent "user B's" information. In this way, the predefined, half rate channel coding structure and existing vocoder can be used even when only one active user is receiving information on a half rate downlink channel. Another possibility is to keep the channel coding structure, but eliminate the vocoder and subsitute predefined data where the speech coded bits would normally occur. Still another option is to eliminate the channel coding and the vocoder and simply fill user B's information stream with predefined bits. Lastly, the second sub-channel could be filled by repeating each information frame transmitted by the one active user, i.e., copying the active user's speech frames into the second sub-channel.

Multi-user multiplexing of information described in the foregoing exemplary embodiments can be used to provide interleaving and reduce the effects of burst errors in half rate radiocommunications. However, multi-user multiplexing also provides the opportunity for multi-user detection, i.e., using the decoded information from one sub-channel to aid in the decoding of information in another sub-channel. This aspect of the present invention will now be described.

The symbol multiplexing and inter-symbol multiplexing described above may also be used to provide additional gain to the decoding/demodulation process. Generally, given that two sub-channels are multiplexed together in one time slot and a radio channel that is subject to fading and interference, it is likely that at least one of the two sub-channels can be decoded correctly. For example, user A's mobile station will receive, and attempt to decode/demodulate the information in its assigned time slots within each frame. User A may be able to successfully decode its own information, after which no additional processing would be needed. If, however, user A is unable to decode its own information, e.g., due to a CRC failure, it may then attempt to decode user B's data which has been multiplexed with user A's information. If user B's can be successfully decoded/demodulated, then the entire burst can be re-encoded and redemodulated and user A's equipment can take a second pass at attempting to decode its information using the known symbols and/or bits of user B's information.

A process for using known information symbols within an information stream to aid in the decoding/demodulation process of unknown symbols per se has been described in earlier literature and, therefore, is not described in detail herein. The interested reader is, however, directed to U.S. Pat. No. 5,673,291, entitled "Simultaneous Demodulation and Decoding of a Digitally Modulated Radio Signal Using Known Symbols" and issued on Sep. 30, 1997 and to International Patent Publication No. WO 98/04047 entitled "Method and Apparatus for Detecting Communication Signals Having Unequal Error Protection", and published on Jan. 29, 1998, the disclosure of each of which is incorporated by reference.

In the context of symbol multiplexing, e.g., as shown in FIG. 8, this process of decoding/demodulating one sub-channel and then re-encoding/remodulating and decoding/demodulating the other sub-channel is straightforward. User A's equipment will first de-interleave and attempt to decode/demodulate the 'A' symbols. If successful, the process ends. Otherwise, user A's equipment will attempt to decode the de-interleaved sub-channel including the 'B' symbols. If successful, the symbols are re-encoded and remodulated, and user A's equipment attempts to decode/demodulate the 'A' symbols using knowledge of the 'B' symbols.

In the context of inter-symbol multiplexing, e.g., as shown in FIG. 9, determining the 'B' bits in user A's equipment before determining the 'A' bits may increase the certainty associated with demodulating the 'A' bits. The exemplary inter-symbol multiplexing illustrated in FIG. 9 portrays three bits per symbol. One exemplary modulation using three bits per symbol is 8-PSK, which has eight constellation points as seen in FIG. 10. The transmitter sets the in-phase and quadrature phase signals corresponding to one of the constellation points. The radius of the circle represents the signal amplitude. At the receiver, noise and other signal impairments will, at the time of symbol decision, generate a received signal which is different than any one of the eight specified constellation points. The more noise associated with the radio channel, the more distance will separate the actual (transmitted) constellation point from the received point on the circle. The received point is interpreted as representing the closest one of the eight points on the constellation. Thus, the most likely error-event is that a signal point is interpreted at the receiver as a constellation point which is adjacent to that which was actually transmitted.

Because of this characteristic impact of noise on the modulation, a common mapping of bits to the constellation uses Grey coding in order to minimize the number of bit errors for the most likely error event. FIG. 11 illustrates one such mapping. For each constellation point, the two nearest neighbors on the circle are assigned bit combinations that differ in value in only one place. Thus, moving from signal point to signal point along the circle only one bit changes at a time. This type of mapping minimizes the number of bits in error when an error occurs.

A Grey coded mapping may be appropriate when symbol multiplexing embodiments of the present invention are employed. However, when inter-symbol multiplexing embodiments are employed other mappings according to the present invention may produce better demodulation results and add processing gain.

Figure 12:
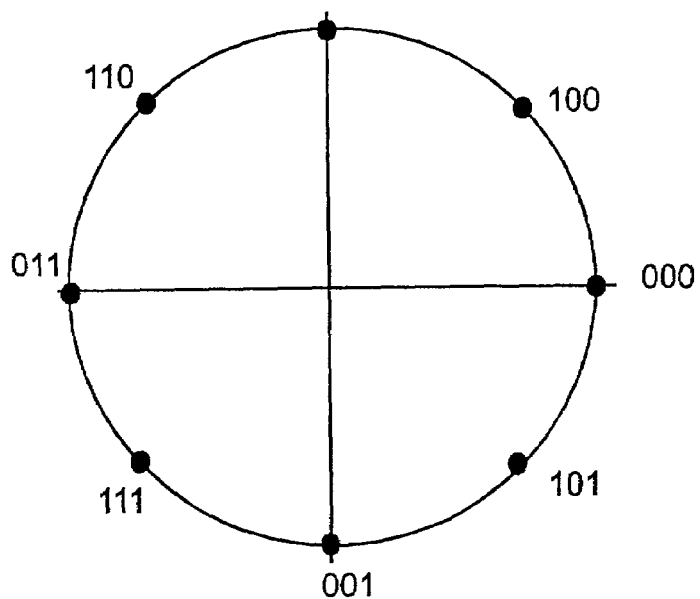
Figure 12:
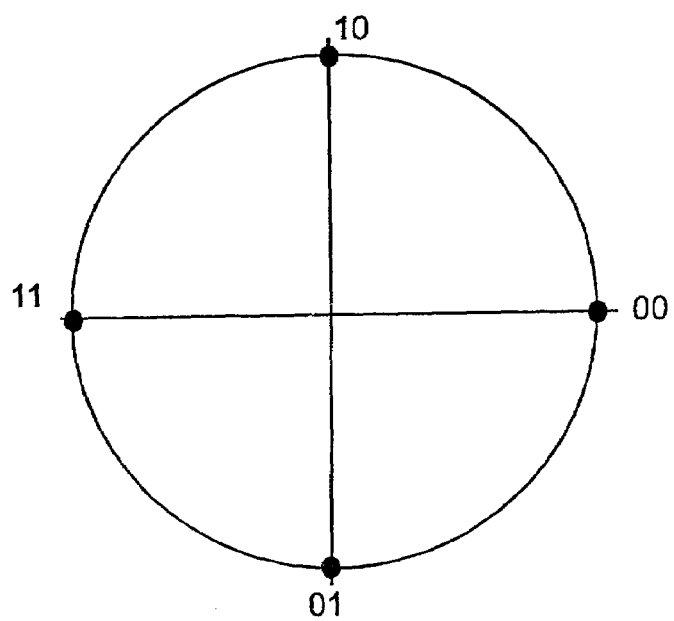
Figure 12:
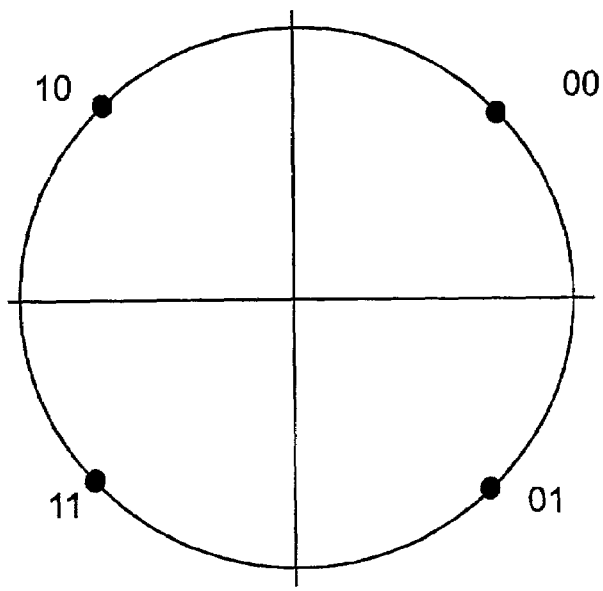

For example consider the exemplary bit mapping for an 8-PSK constellation illustrated in FIG. 12(a) which can be used in conjunction with the inter-symbol multiplexing techniques described above. As mentioned above, by decoding the sub-channel for the other user first, a known bit or bits may be identified for a symbol involving the sub-channel of interest. If the most significant bit (MSB), i.e., the leftmost bit assigned to each point in the constellation of FIG. 12(a) is known, then the demodulation problem reduces to QPSK. For example, if the MSB is known have a value of '1', then the constellation reduces to that shown in FIG. 12(b). If the MSB is known to have a value of '0', then the constellation reduces to that shown in FIG. 12(c).

Using the mapping illustrated in FIG. 12(a) for 8-PSK modulation and the multi-user detection techniques described above, the modulation may be more tolerant to noise and other signal impairments than the Grey coded mapping illustrated in FIG. 11. This can be readily observed by noting that the minimum distance between any of the remaining points in FIGS. 12(b) and 12(c) are 90 degrees apart, while the distance between the remaining points in FIG. 11 is 45 degrees. However, this does not necessarily mean that the mapping in FIG. 12(a) is optimal for all applications. For example, the mapping in FIG. 12(a) is particularly poor when the MSB is not known, since every point has as its neighbor an MSB of the opposite value which maximizes a possibility that the wrong constellation point will be selected when the MSB is not known. By way of contrast, the mapping of FIG. 11 is better than that of FIG. 12(a) when the MSB is not known.

Figure 13:
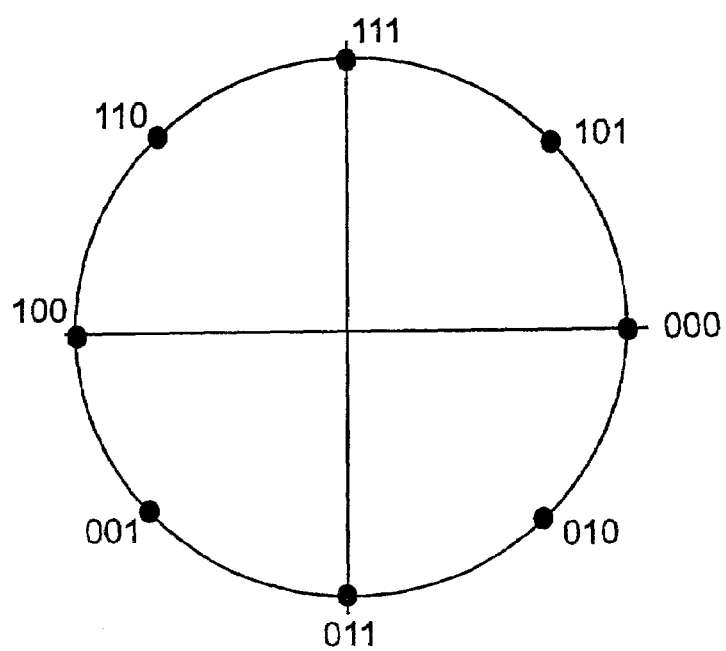
Figure 13:
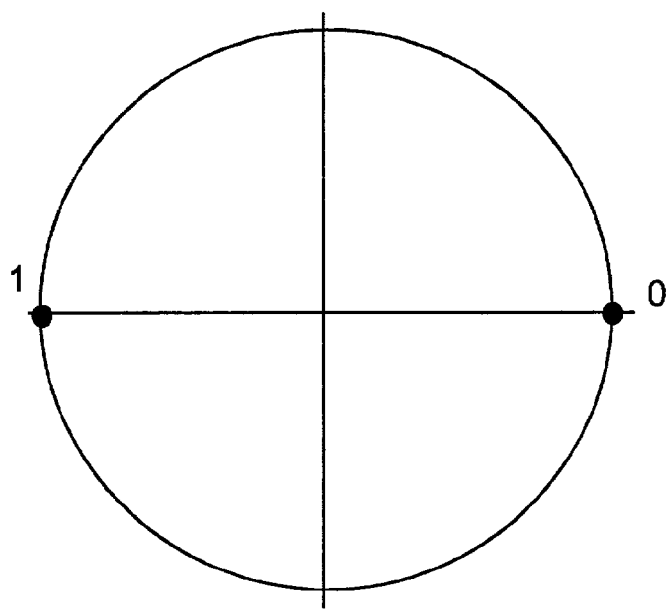
Figure 13:
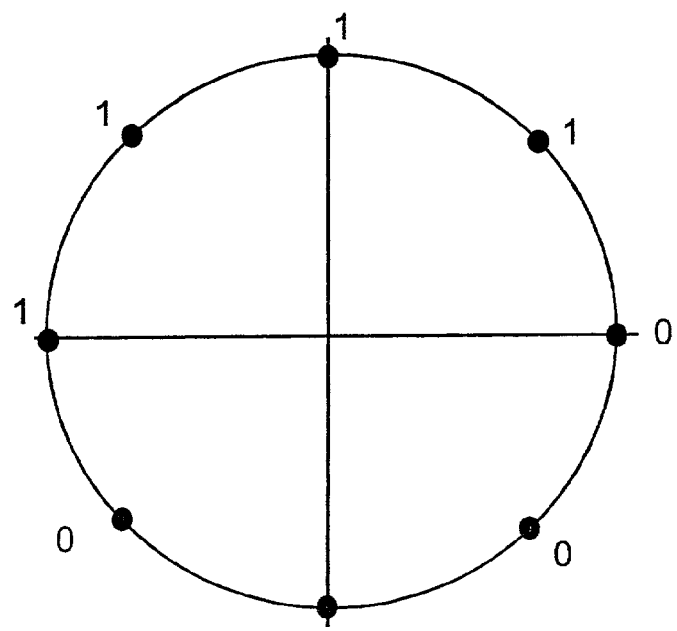
Figure 13:
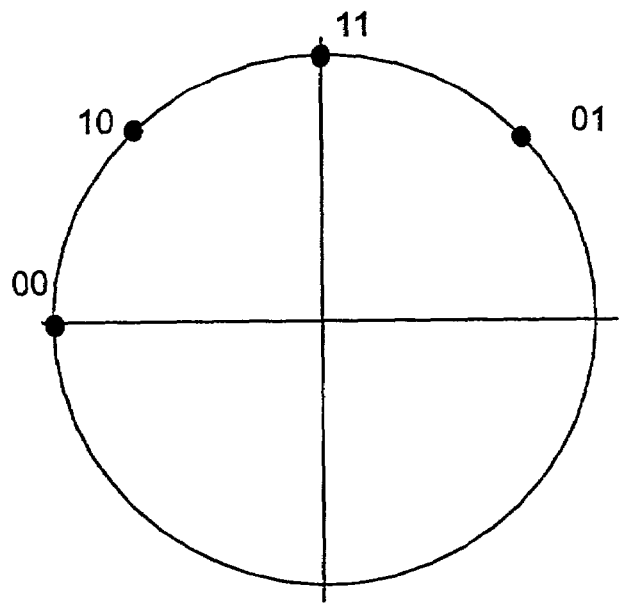

Other mappings should also be considered. For example, FIG. 13(a) illustrates an optimal mapping for the MSB when the two least significant bits (LSBs) are known. For each case, the remaining points are separated by 180 degrees. For example, as seen in FIG. 13(b), when the two LSBs are both zero, the remaining constellation effectively reduces to BPSK. This mapping is also optimal for the case where the MSB is detected without knowing the two LSBs as can be seen in FIG. 13(c). Therein, it will be appreciated by those skilled in the art that since four of the signal points have only one neighbor with a different MSB value and for the other four of the signal points the neighbors have the same assigned MSB values, this represents an optimal mapping in terms of MSB detection.

However, a weakness of the mapping of depicted in FIG. 13(a) becomes apparent when trying to determine the 2 LSBs when the MSB is known. Consider FIG. 13(d) wherein it is assumed that the MSB has a value of '1'. Therein, it can be seen that the two signal points in the middle of the four remaining points both have neighbors with different values spaced apart by 45 degrees, which is one of the worst possible results for combatting noise (although they are, however, Grey encoded).

Figure 14:
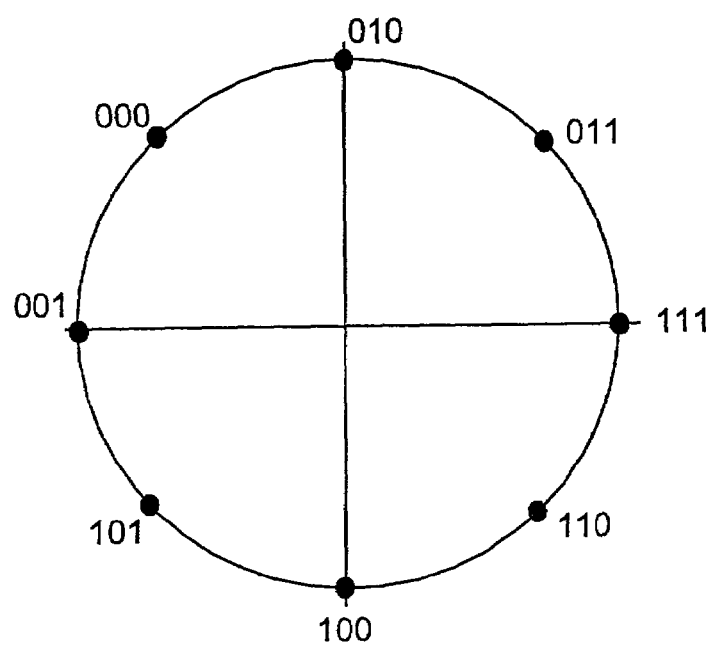
Figure 14:
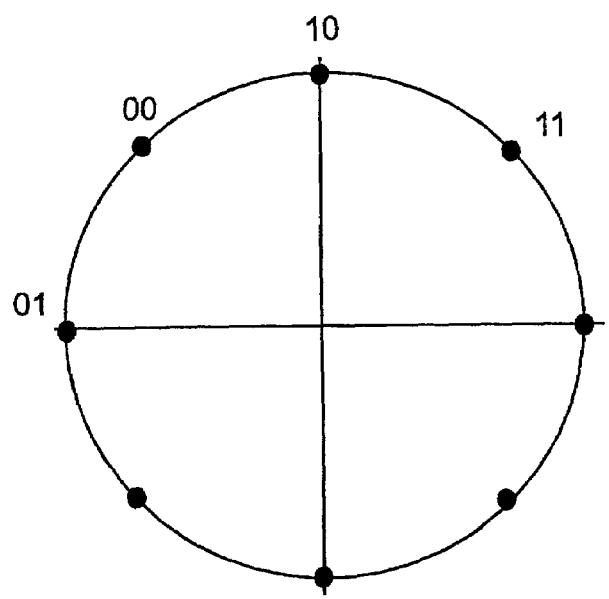

Yet another constellation mapping is illustrated in FIG. 14(a). This mapping may present a slight improvement over the exemplary mapping of FIG. 13(a) for the case where the MSB is known and the 2 LSBs are being detected. This can be seen in FIG. 14(b), where the MSB has a value of '0', wherein it is apparent that the two middle remaining signal points have the same LSB value.

Thus, it will be apparent that changing the constellation mapping used in the modulation process can provide different noise immunity properties given knowledge of one or more bits in each received symbol. Since the inter-symbol multiplexing technique provided above provides bits associated with two different sub-channels to be disposed in one symbol, the opportunity to select a preferred mapping arises. The selection of a particular mapping, however, depends upon the channel coding involved in each sub-channel, the bit pattern used in selecting bits for the inter-symbol multiplexing, the system design and the desired result.

For example, the most heavily protected bits (e.g., class 1 bits in the D-AMPS example described above) from each user or connection could be mapped to an MSB of each symbol while using a mapping that maximizes the detection of these bits. Then, the re-encoding/remodulation procedure described above will make it easier to decode the remaining 2 LSBs. Another alternative is to increase the channel coding for the already most highly protected bits from the source and use the mapping of FIG. 12(a). Since more channel coding is used, the performance associated with detecting these MSBs may be better than that for the mapping of FIG. 11 even though the mapping is less favorable for MSBs per se. Then, since the remaining signal points in the constellation of FIG. 12(b) or 12(c) are optimally place, less channel coding can be used to protect these bits.

Yet another alternative is to allocate the most channel coding to a few LSBs using the mapping in FIG. 12(a) and detect these bits first, which mapping is optimal for this form of detection. The MSBs, which have the least favorable mapping in this constellation, may be allocated to the least important bits in a source.

Another alternative is to use the mapping illustrated in FIG. 13(a) and allocate bits in an information stream to a few LSBs. These bits are again detected first, but the MSBs are now better positioned than in the preceding example. If there is an uncoded class in the bit streams that are being multiplexed together, then the latter alternative provides a better quality frame of bits when the condition of the channel is fairly good. The former method increases the likelihood that the most important bits can be correctly recovered while the least important bits may more frequently have bit errors.

Yet another strategy involves first detecting the MSBs using the mapping in either FIG. 13(a) or FIG. 14(a) then, after re-encoding, detecting the LSB. In this detection two of the four signal points have no close neighbors of different value. Then, after another re-encoding, potentially from a different channel, the remaining bit is detected. The receiver may first try with one channel. If it cannot successfully decode (e.g., by checking a CRC) the other channel (other bit) is decoded. Since the channel coding spans several bits and, therefore, several symbols, another channel may be successfully decoded even though the first channel decoding failed. The subsequent re-encoding may reduce the number of errors in the symbol-to-bit detection, which then can accommodate the remaining errors in the channel which, at the first attempt, could not be channel decoded.

Those skilled in the art will appreciate that for a particular strategy, especially if the three bits are detected at three different instances with intermediate re-encoding, better mappings than illustrated herein may be possible. Moreover, for each sub-channel different classes of bits may be transmitted. Each class of bits comprises those bits subject to the same channel coding protection. For example, one sub-channel may have class one and class 2 bits as described above, while another sub-channel carries data which involves a third and, possibly, a fourth class of bits. Those skilled in the art will appreciate that these classes of bits may be mapped using more than one bit-to-symbol mapping, i.e., in one symbol this class is mapped to a first subset of bits, while for another symbol this class is mapped to a second subset of bits.

For each particular source, modulation method (e.g., 8-PSK, 16QAM, etc.), air interface (e.g., IS-136, GSM, IS-95, PDC, etc.), extensive computer simulations can be used to determine an optimal allocation of channel coding and multi-user multiplexing method as described herein. For example, some symbols may be allocated to a single channel. If these symbols can be detected correctly, the next channel can use these symbols to estimate the state (phase) of the channel, i.e., using these symbols as reference or pilot symbols.

Figure 15:
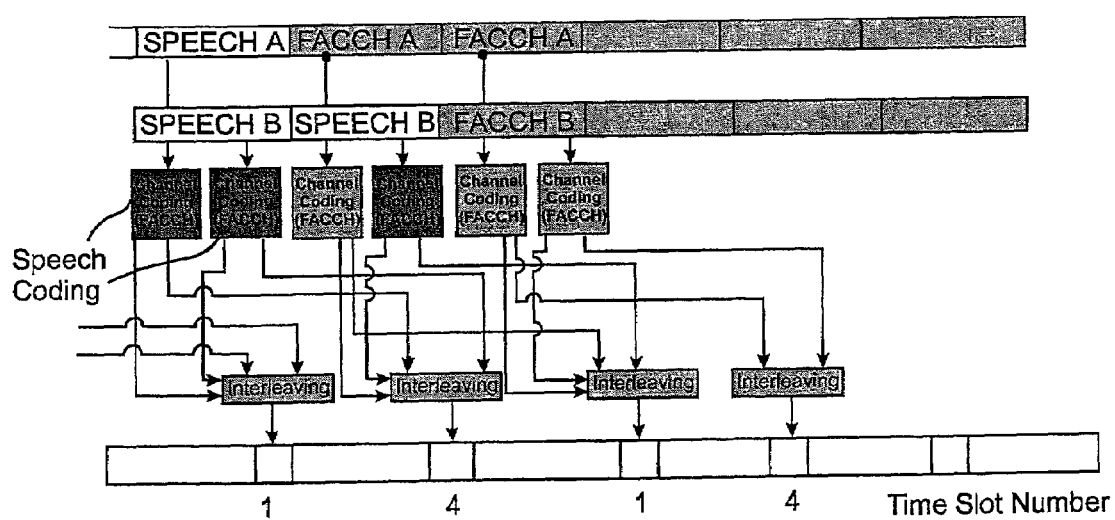
FIG. 15 depicts speech and FACCH interleaving and channel coding according to one exemplary embodiment of the present invention.

In addition to their effects on modulation and demodulation techniques, overhead signalling and channel coding should also be considered. For the two voice sub-channels which are multiplexed onto each time slot, common channel coding can be used. However, in D-AMPS, the traffic channel frequency carries multiplexed therewith a fast associated control channel (FACCH) which provides more urgent, overhead information to the mobile stations. Two possibilities exist for handling the FACCH in the context of multi-user multiplexing. First, as illustrated, for example in FIG. 15, speech and FACCH can be separately channel coded. In this example, the FACCH words are shortened to fit into the half rate portion of each time slot. Alternatively, each FACCH can steal 2 speech frames or the amount of channel coding on FACCH information can be reduced to fit into the half rate scheme.

A second possibility is that the signalling FACCH can be common ('CFACCH') for both users multiplexed onto a half rate channel. In this solution, the FACCH word length can remain the same as the full rate FACCH. However, this solution affects both user A and user B (user B's speech frame will also be blanked out), even though the message is intended for only one user. Thus the use of CFACCH will cause shorter, but more frequent interruptions in the transmission of speech than the use of distinctly coded FACCH's for each user. A discriminator inside the CFACCH word can indicate the intended recipient, i.e., A, B or both. The CFAACH can be divided into two sub-fields, one for each user.

Other overhead signalling may also require consideration when two users are multiplexed into a single downlink time slot. Consider the exemplary downlink slot formats of FIGS. 16(a) (8-PSK) and 16(b) (8-DPSK) which are designed for full rate communication. In FIG. 16(a), the SYNC field provides synchronization bits for acquiring timing alignment to the slot. The REF field provides reference symbols which may be used as a reference to assist in begin coherent demodulation of information. Several PLT fields are interspersed to provide pilot symbols. The pilot symbols provide phase reference information so that the receiver can track the time-varying effects of the radio channel on the transmitted information. Various payload DATA fields are also provided in this exemplary downlink timeslot format. The ending ramp field provides a period during which the transmitter can ramp down its output power to reduce adjacent channel interference. FIG. 16(b) illustrates an exemplary downlink slot format for differentially encoded, modulated information. Since differential encoding is used, pilot symbols are not necessary.

The structure of these exemplary full rate downlink time slots may require certain operational adjustments in order to operate with the multi-user multiplexing described above. For example, with two users per time slot a Power Control (PC) function has to accommodate controlling the output power of the transmitters of each user. These exemplary downlink slot formats, however, provide for only one power control bit. Two alternatives for controlling the output power of each user can be provided. First, an additional bit could be added to the power control field, with some implicit understanding between the users as to which bit controls which user's output power. Second, the usage of this bit could be time multiplexed, e.g., user A could use the PC bit in time slot 1 while user B uses the PC bit in time slot 4. The first solution reduces the payload data by one bit, while the second solution reduces the speed of the power control loop by a factor of two.

For both full rate and half rate communications (one or two users per slot), the PC bit may be grouped into a multi-bit value before an interpretation of the PC data is made. For example, after receiving two time slots of data, the value 00 may mean no change, 01 increase with x dB, 10 increase with y dB and 11 can mean no change or reserved or increase with z dB. These changes (x,y,z) can be further filtered over time and, when the output of that filter makes the desired power level differ from the actual power level by w dB, a change can be made.

Figure 1:
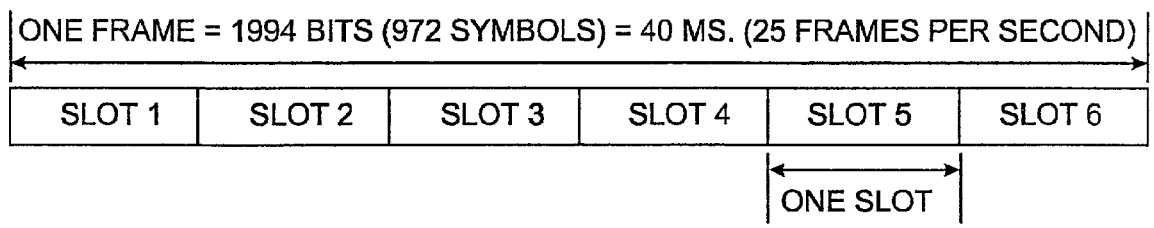
FIG. 1 illustrates an exemplary frame format in a conventional IS-136.
Figure 2:
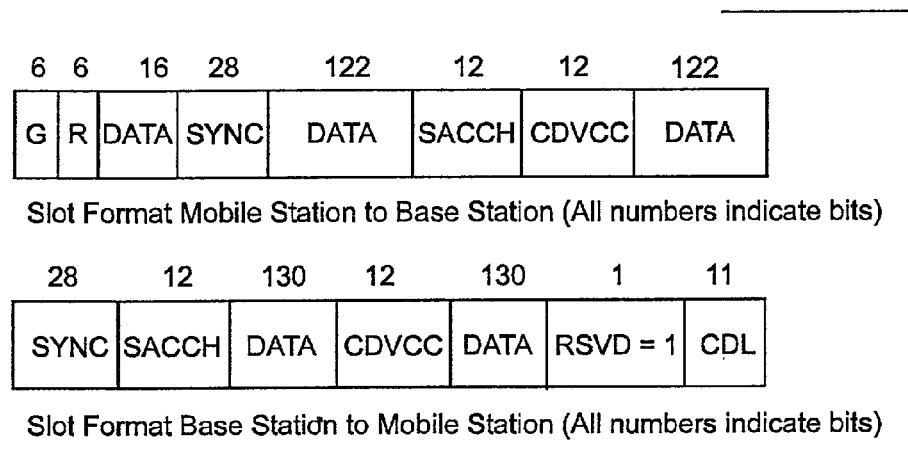
FIG. 2 illustrates both an uplink (upper) and a downlink (lower) time slot format for a conventional IS-136 system.
Figure 3:
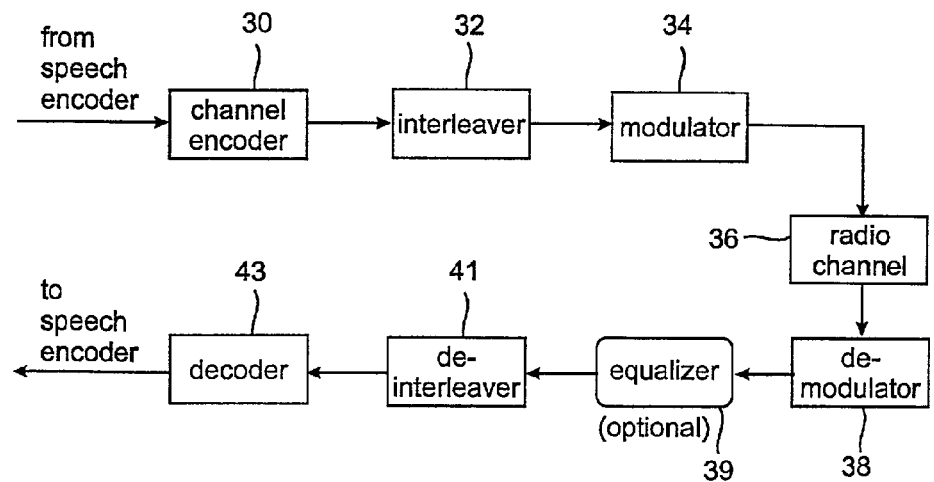
FIG. 3 is a functional block diagram of an exemplary, conventional radiocommunication system.
Figure 4:
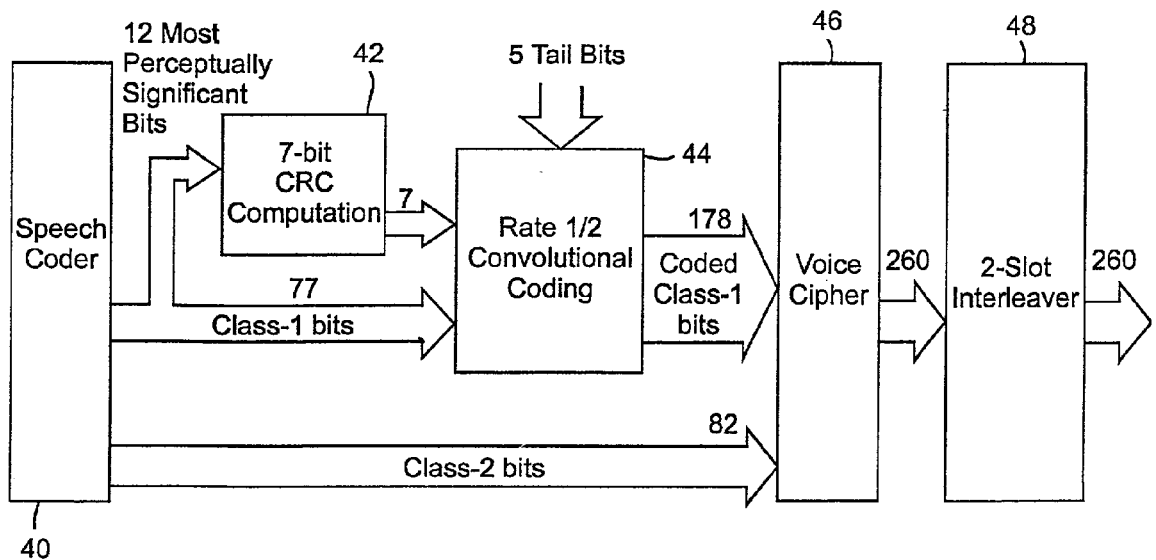
FIG. 4 depicts channel coding and interleaving according to a conventional IS-136 system.

Of course, those skilled in the art will appreciate that it is not possible to use the re-encoding techniques described above if encryption is applied after channel coding as, for example, in the D-AMPS example provided above in FIG. 4. If encryption is applied after channel coding, then user A would not be able to decrypt user B's sub-channel information, check the CRC and then re-encode/remodulate the information for the second pass. Instead, exemplary embodiments of the present invention provide for encryption (if any) to be applied before channel encoding, e.g., on the speech frame.

Lastly, mode signalling can be provided to inform mobile stations of various effects created by the foregoing exemplary embodiments of the present invention. For example, the following signalling can occur at the start of a call and during a call, including as part of a handoff command. With reference to the above-described embodiment wherein only one active user is currently transmitting on an otherwise half rate time slot, the mobile station may be informed of the format (channel coding, other sub-channel's data, etc.) of the second sub-channel. Moreover, a flag can be sent to the mobile station informing it as to whether the second sub-channel which is multiplexed into its designated time slots can be used for re-encoding as described above. Other mode signalling may include the usage of the PC bit(s) and whether CFACCH is enabled. For example a single bit flag could be sent to a mobile station which indicates a modality package, e.g., MMFLAG=1, might mean that the recipient mobile station should transmit on the uplink in the time slot corresponding to its second downlink time slot in a frame, that it should consider the odd bits in each of its two assigned downlink time slots to comprise its sub-channel and that it should read the PC bit in its second downlink time slot in each frame to adjust its power. Alternatively, the explicit information can be reduced by defining each of these characteristics for each sub-channel and then simply informing the mobile station to which sub-channel it is assigned. That is, for a given multiplexing scheme according to the present invention, e.g., symbol multiplexing, inter-symbol multiplexing, or a combination thereof, two (or more) sub-channels are created. The mode signalling bit can indicate to the mobile on which sub-channel it will receive information, in response to which it will implicitly (through pre-programming) know which bits belong to its channel, which power control bit is associated with its transmit power, etc.

Additional exemplary embodiments of the present invention will now be discussed to further illustrate how the re-encoding techniques described above can be applied to improve the demodulation/detection of multiple information streams. As will be appreciated by those skilled in the art, demodulation refers to the process of channel estimation and extracting soft received samples. Typically, both the phase and amplitude of the channel are estimated for use in the demodulation process. However, for some modulations or when equalization is not performed (e.g., no time dispersion), only the phase may be tracked. Synchronization words and pilots may be used in estimating the channel.

When the modulation is contained in the absolute value of the symbol, for example the phase in 8PSK, it is important to undo any phase changes that the fading of the transmitted signal has introduced before coherently demodulating the received signal. For differentially encoded signals, where -the modulation is contained in a phase shift from one symbol to another, it may be less important to accurately track the phase changes of the channel prior to demodulation. However, differentially encoded signals can first be coherently demodulated and, subsequently differential decoding can take place to improve performance as compared with a receiver which only looks for the phase difference between symbols. Thus, for modulation based on either an absolute or relative symbol value there can be an interest to track the channel. Moreover, when symbol interference due to timedispersion is present or when the modulation format contains information in the amplitude of the signal, e.g. 16 QAM, it is also of importance to track the amplitude of the channel which, due to the Rayleigh fading, can be subject to rapid changes.

The accuracy of channel estimation will improve if re-encoding is performed as bits are decoded. Thus, the two-pass demodulation process described above can be generalized to periodically re-estimate the channel and use the re-estimated channel estimates in subsequent demodulations. The following provides an example of how such a process can be performed.

Initially, define different classes of the information streams based on their varying -channel coding from each source frame as 1,2, . . . n. For the purposes of this example, assume that the interleaving is two slot diagonal interleaving (as for IS-136 systems).

In this example, each user U1, U2 . . . Uw receives and processes slots . . . ,m−2,m−1,m,m+1,m+2, . . . , etc. These slots are transmitted, using the IS-136 example, on time slot pairs 1&4 or 2&5 or 3&6. When processing slot m in the receiver in order to generate speech frame j, half of the bits in time slot m are related to another speech frame (i.e, speech frame j+1) which other speech frame includes bits which are also sent in time slot m+1 (i.e., due to the two slot interleaving used in IS-136, see FIG. 7). The demodulation of time slot m according to the present invention could be performed as follows:

Receive slot m for the final processing of source frame j
Demodulate
Decode class 1 bits of user U1
　Re-encode, re-interleave using the decoded data
Demodulate
Decode class 1 bits of user U2 given the result from previous decoding step
　Re-encode, re-interleave using the decoded data
Decode class 1 bits of user Uw given the result from previous decoding steps
　Re-encode, re-interleave using the decoded data
Demodulate
Decode class 2 bits of user U1 given the result from previous decoding steps
Demodulate
Decode class 2 bits of user Uw given the result from previous decoding steps
Decode class n of user Uw given the result from previous decoding steps
Demodulate
For each user U1 . . . Uw, source frame j is now recovered.
The process can continue with time slot m+1 to recover frame j+1.

Half of the bits of time slot m will be used in the processing of frame j+1 which will happen during processing of time slot m+1. In order to have the best quality samples from time slot m when processing time slot m+1, a last demodulation of slot m is performed after all the decoding for slot m is finished. Furthermore, the least protected class (n) in the set of classes is often not protected at all by error correction coding. A final demodulation after all the protected classes are processed will enhance demodulation of the unprotected bits.

As described in the above-incorporated International Patent Publication No. WO 98/04047 entitled "Method and Apparatus for Detecting Communication Signals Having Unequal Error Protection", the information fed back for use in the re-encoding, re-interleaving and remodulation process may be soft (i.e., likelihood) information to provide improved performance. For example, the modulation constellation in FIG. 12(*a*) may not collapse to distinctly either that shown in FIGS. 12(*b*) or 12(*c*). Instead, the fed back soft information indicates a likelihood that the constellation of FIG. 12(*b*) is relevant and another likelihood that the constellation of FIG. 12(*c*) is relevant.

Of course, the algorithm described above is just one of numerous variations on the re-encoding theme which can be employed in conjunction with multi-user detection according to the present invention. For example, the estimation of the radio channel need not be performed after every single class has been decoded for every user. It may be sufficient to only re-estimate the radio channel after the most protected class of bits is decoded. Half of the bits in any given time slot will be used when processing a subsequent time slot. Hence, it may advantageous to perform a final channel estimation and demodulation when all channel decoding is completed for a burst in the interest of getting as high a data quality as possible when starting the decoding of the first selected class of bits and user in the subsequent burst. Moreover, if there is an indication, e.g., by a CRC check or the soft information from the previously decoded bits, that the information is not reliable, the receiver may skip to another user's data or to another class before continuing in order not to introduce further degradation of the received samples.

U.S. Pat. No. 5,673,291 to Paul Dent (mentioned above) teaches further refinements which may be employed in the context of the present invention. For example, the channel estimation and the channel decoding described above need not be separated into two distinct processes. For example, when using a Viterbi channel decoder, each state can have a separate channel estimator, which state is updated for each decoded bit. Another refinement is to decode the information from the multiple users and multiple classes in parallel. For each step in the Viterbi decoder, modified input data to all other Viterbi decoders may be produced.

For speech transmission, the delay when processing the data should generally be minimized. However, if more delay can be tolerated than has already been introduced by the speech coder and the two slot interleaving, further performance improvement can be gained. For example, when frame j is decoded (which happens after processing of slot m has finished), the data from slot m−1 that was used in the decoding of frame j during slot m can be reintroduced in slot m−1. Decoding frame j−1 can now be further improved. Having now improved the data in slot m−1 and since half of those bits are used together with data in slot m to form frame j, the slot m can now be reprocessed. Thus, the performance can be improved by iterative processing. However, since frame j−1 can not be released to the speech decoder until one slot later, this iterative processing introduces delay. A tradeoff between delay and performance improvement would be to release the frame j−1 to the speech decoder after slot m−1 is processed, so that the iterative processing is used to enhance the bits of slot m−1 that affect frame j. In this process a stored copy of frame j−1 is used. If bits in frame j−1 were changed, this will have no effect on the frame j−1 delivered to the speech decoder. Another, somewhat more elaborate example is to reintroduce the now improved bits in slot m−1 into slot m−2 and then work forward in time to first further improve slot m−1 and finally slot m. It should be apparent to the person skilled in the art that many variations are possible.

A simple but practical example is now presented with limited complexity to ease understanding and which does not perform any iterative inter-slot processing. The source is a speech coder with three classes. Class 1*a* which is protected with a CRC and encoded with a first coding rate, class 1*b* has no CRC and is encoded with a second coding rate and class 2 has no CRC or channel coding. The algorithm is designed based on the assumption that class 1a is more protected (i.e., has a lower coding rate and thus more redundancy) than class 1b and that there is no FACCH type of interruption of the speech service (as described above with respect to FIG. 15. The following steps can be performed in this exemplary algorithm (italicized expressions defined below):

Receive slot m for the final processing of source frame j. The assigned channel is A.

[1] Demodulate. Set q=0
[2] Decode class 1a of user A
    If CRC=OK THEN update received date, Set q=a
    Decode class 1a of user B
    If CRC=OK THEN updated received date, Set q=q+a
[3] Case 1: If user A CRC=Not OK AND user B CRC=Not OK THEN GOTO[ERR]
    Case 2: If user A CRC=OK AND user B CRC=Not OK THEN GOTO [4]
    Case 3: If user A CRC=Not OK AND user B CRC=OK
        Decode class 1a of user A
        IF user A CRC=OK, THEN update received date, Set q=q+a and GOTO [4], OTHERWISE GOTO [ERR]
    Case 4: If user A CRC=OK AND user B CRC=OK THEN GOTO[4]
[4] IF q>=a THEN re phase adjust and Set q=0
    Decode class 1b of user A If metric=OK THEN update received date and Set q=q+b
    Decode class 1b of user B If metric=OK THEN update received date and Set q=q+b
[5] IF q>=b THEN re phase adjust
    Decode class 2 for user A
    Extract class 2 bits for user A and all bits related to frame j+1 for both users
[6] Send frame j to speech decoder. Store bits associated with frame j+1. GOTO [END]
[ERR] Declare frame j as undecodable. Store bits associated with frame j+1
[END] Proceed decoding frame j+1

In the foregoing exemplary algorithm, the term update received date means that in further processing of the received data the result of the decoding shall be reflected (soft or hard information) in the further processing of the received data. The actual formatting (channel re-encode, interleaving, inter-symbol multiplexing) is implicitly understood in the algorithm.

The term demodulate means to extract the soft values from the received burst. This includes the aspect of first estimating and then compensating for the phase shift introduced by Rayleigh fading. Prior to demodulating, time synchronization has been performed in which a symbol spaced set of samples has been extract from an over-sampled received signal.

The term re-phase adjust means to improve the correction of the phase errors introduced by the Rayleigh fading using the decoded data.

The value of the constants a and b in the foregoing example are dependent on the relative protection level of class 1a and class 1b. The intent is to set these constants to values such that re phase adjustment is performed only if the decoding has been successful enough to warrant a re phase adjustment. Note that the next frame (j+1) may benefit from the re phase adjustment even if class 1a can not be recovered correctly. In the foregoing example, a relatively simple approach is taken to decide whether the received samples should be re phase adjusted, i.e., after having decoded class 1a from both users, perform re phase adjustment if at least one of the decoding passes was successful. Phase re adjust is performed again if at least one of the class 1b information streams was successfully decoded.

A more general example for determining whether re adjustments should take place could be to use a and b as variables which are set equal to quality metrics received from the channel decoder and then to examine at each iteration described above whether q>=c. In this more general example, the value of c is a threshold value which could be determined based on simulations involving many values including, for example, the channel coding, and could vary depending on soft output from the decoding processes.

When evaluating the quality of the decoded class 1a bits, the CRC can be used as a quality indicator. For class 1b, an absolute or relative threshold of the Viterbi decoder's cost function selected path can be used. A relative threshold can be to compare the metric of the selected path with the selected path of the class 1a bits, scaled with an appropriate value depending on e.g. the number of gross bits in class 1a and class 1b respectively.

It will be seen from the foregoing example that the frame j is discarded if neither user A nor user B's class 1a bits provides a positive CRC check. This provision was described in the foregoing example merely to limit complexity for illustration purposes. In most cases, further processing of the class 1b bits will not permit correct recovery of the class 1a bits. However, depending upon the amount of channel coding used in each class, discarding the frame when the CRC fails for the class 1a bits may be undesirable. Thus, the class 1b bits of user A could be decoded at step [3] instead of giving up. If successful, according to a metric, decoding of class 1a bits could be retried. However, this latter approach increases the decoding complexity.

According to yet another exemplary embodiment of the present invention, noisy radio channel conditions on the uplink can be addressed by switching between several of the transmission modes described above. One exemplary context in which noisy radio channel conditions may arise is in range-limited systems wherein the distance between a base station and a mobile station may be such that the noise in the radio channel may reduce the received signal quality at either the base station or the mobile station to unacceptable levels. This problem can be more readily addressed for the downlink by increasing the antenna height at the base station and/or increasing the transmit power. For example, the base station may be able to transmit at 50 W/carrier or more. However, the uplink is more problematic since the antenna size of the mobile cannot be easily increased nor are the power amplifiers used in mobile stations designed to support significant increases in transmit power, e.g., mobile stations typically can transmit at levels on the order of 0.6 W.

Thus, when noisy channel conditions are experienced in the uplink, e.g., as detected based upon the received signal quality at the base station, exemplary embodiments of the present invention provide for a user to switch from, for example, the half rate transmission described above to using full rate bandwidth (e.g., bandwidth equivalent to two full time slots per frame per user). The additional bandwidth can be used in several different ways to add additional bits that provide for better received signal quality at the base station. For example, the full rate vocoder and channel coding can be used which may provide additional robustness in the context of noise resistance. Alternatively, the half rate vocoder can still be used, but additional channel coding can be provided, the increased redundancy of which can be used to correct more errors. Yet another alternative is to copy the bits from each time slot into the new (full rate) time slots. This provides a form of diversity which information can be combined or selected at the base station to improve the received signal quality. If the signal quality received at the base station improves to an acceptable extent, the system may recognize the reduction in noise effects and return the mobile station to half rate transmission mode. Of course, as described above, changes in the transmission mode may be accompanied by suitable mode signalling to the mobile station to indicate the change.

Although the invention has been described in detail with reference only to a few exemplary embodiments, those skilled in the art will appreciate that various modifications can be made without departing from the invention. For example, although the present invention has been described in conjunction with half rate communications those skilled in the art will appreciate that the concepts set forth herein can be extended to one third rate, one quarter rate, etc. with additional users or sources being multiplexed into the same bandwidth. Accordingly, the invention is defined only by the following claims which are intended to embrace all equivalents thereof.

What is claimed is:

1. A method for decoding received information wherein a plurality of users' information is interleaved over a given time period comprising the steps of:
   providing, within each user's information, at least a first and a second class, wherein said first class has more redundancy than said second class;
   decoding said first class of a first user's information from said received information;
   re-encoding said received information using the decoded information from said previous step;
   decoding said first class of a second user's information from said received information based on said decoded first class of said first user's information;
   re-encoding said received information using the decoded information from said previous step;
   decoding said second class of said first user's information from said received information based on said decoded first class of said first and second users' information:
   re-encoding said received information using the decoded information from said previous step; and
   decoding said second class of said second user's information from said received information based on said decoded first class of said first and second users' information and said second class of said first user's information.

2. The method of claim 1, further comprising the step of:
   estimating a channel over which said received information is transmitted after each class of information has been decoded for each of said plurality of users.

3. The method of claim 1, further comprising the step of:
   estimating a channel over which said received information is transmitted only after a most protected class of information has been decoded for each of said plurality of users.

4. The method of claim 1, further comprising the step of:
   estimating a channel over which said received information is transmitted after a final decoding step associated with said received information.

5. The method of claim 1, wherein said steps of decoding are performed in parallel.

6. A method for communicating information in a radio-communication system comprising the steps of:
   interleaving a first user's information and a second user's information by providing a repeated symbol pattern including at least one symbol containing bits solely associated with said first user's information followed by at least one symbol including bits solely associated with said second user's information followed by at least one symbol containing bits solely associated with said first user's information;
   transmitting said interleaved first and second user's information in a first time slot;
   decoding information to said first user;
   improving a channel estimate based on said decoded information;
   re-encoding said information; and
   decoding information to said second user based on said improved channel estimate.

7. The method of claim 6, wherein said repeated symbol pattern is alternating symbols.

8. The method of claim 6, further comprising the step of:
   providing a predetermined number of time slots per frame;
   interleaving additional information to said first user and additional information to said second user in a second time slot within said frame; and
   transmitting said second time slot.

9. The method of claim 8, wherein said predetermined number is six.

10. The method of claim 6, further comprising the step of:
    explicitly informing first and second mobile stations associated with said first and second user's information, respectively, of their assigned uplink time slots.

11. The method of claim 10, wherein said step of explicitly informing further comprises the step of:
    transmitting an information element including an identification of said assigned uplink time slots.

12. The method of claim 6, further comprising the step of:
    implicitly informing first and second mobile stations associated with said first and second user's information, respectively, of their assigned uplink time slots.

13. The method of claim 12, wherein said step of implicitly informing further comprises the step of:
    recognizing said assigned uplink time slots based on an information element transmitted to said first and second mobile stations regarding downlink time slots.

14. A method for communicating information in a radio-communication system comprising the steps of:
    interleaving a first user's information and a second user's information by multiplexing said first and second user's information on a bit-by-bit basis, wherein at least one bit from said first user and at least one bit from said second user can be included in one symbol;
    transmitting said interleaved first and second user's information in a first time slot;
    decoding information to said first user;
    improving a channel estimate based on said decoded information;
    re-encoding said information; and
    decoding information to said second user based on said improved channel estimate.

15. The method of claim 14, wherein said step of multiplexing further comprises the step of:
    providing a first symbol containing two bits of said first user's information and one bit of said second user's information followed by a second symbol containing two bits of said second user's information and one bit of said first user's information.

16. The method of claim 14, further comprising the step of:
explicitly informing first and second mobile stations associated with said first and second user's information, respectively, of their assigned uplink time slots.

17. The method of claim 16, wherein said step of explicitly informing further comprises the step of:
transmitting an information element including an identification of said assigned uplink time slots.

18. The method of claim 14, further comprising the step of:
implicitly informing first and second mobile stations associated with said first and second user's information, respectively, of their assigned uplink time slots.

19. The method of claim 18, wherein said step of implicitly informing further comprises the step of:
recognizing said assigned uplink time slots based on an information element transmitted to said first and second mobile stations regarding downlink time slots.

* * * * *